(12) United States Patent
Hanson et al.

(10) Patent No.: US 11,753,875 B2
(45) Date of Patent: Sep. 12, 2023

(54) VENTURI ACTIVATED DOWNHOLE TORQUE LIMITER

(71) Applicant: Halliburton Energy Services, Inc., Houston, TX (US)

(72) Inventors: Jon-Howard Elliott Hanson, Carrollton, TX (US); Kyle Davis, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/368,286

(22) Filed: Jul. 6, 2021

(65) Prior Publication Data

US 2023/0008617 A1 Jan. 12, 2023

(51) Int. Cl.
| | | |
|---|---|---|
| *E21B 34/08* | (2006.01) | |
| *F16D 7/02* | (2006.01) | |
| *F16D 7/00* | (2006.01) | |
| *F16D 13/04* | (2006.01) | |
| *E21B 34/06* | (2006.01) | |
| *E21B 17/04* | (2006.01) | |
| *E21B 17/06* | (2006.01) | |

(52) U.S. Cl.
CPC .............. *E21B 17/04* (2013.01); *E21B 17/06* (2013.01); *E21B 34/08* (2013.01); *E21B 34/06* (2013.01); *F16D 7/00* (2013.01); *F16D 7/024* (2013.01); *F16D 7/025* (2013.01); *F16D 13/04* (2013.01)

(58) Field of Classification Search
CPC ........ E21B 17/06; E21B 17/04; E21B 17/041; E21B 34/06; E21B 34/08; F16D 7/00; F16D 7/024; F16D 7/025; F16D 13/04
See application file for complete search history.

(56) References Cited

U.S. PATENT DOCUMENTS

| | | |
|---|---|---|
| 6,799,634 B2 | 10/2004 | Hartog et al. |
| 8,616,292 B2 | 12/2013 | Knobloch, Jr. et al. |
| 2014/0166370 A1 | 6/2014 | D Silva |
| 2017/0009534 A1 | 1/2017 | Sullivan et al. |
| 2017/0051562 A1 | 2/2017 | Knobloch, Jr. et al. |

FOREIGN PATENT DOCUMENTS

| | | |
|---|---|---|
| AU | 2015395669 A1 | 8/2017 |
| WO | 2013043153 A1 | 3/2013 |
| WO | 2020112080 A1 | 6/2020 |

*Primary Examiner* — George S Gray
(74) *Attorney, Agent, or Firm* — Scott Richardson Parker Justiss, P.C.

(57) ABSTRACT

A downhole torque limiter. The downhole torque limiter may include a tubular housing; a pipe positioned within the tubular housing, the pipe transitioning from a larger inside diameter ($ID_L$) to a smaller inside diameter ($ID_S$), thereby forming a venturi profile having a first pressure zone ($Z_1$) and a second pressure zone ($Z_2$); a tubular valve plate radially positioned between the tubular housing and the pipe and rotationally fixed with the pipe; a lower sub rotationally fixed relative to the tubular housing and rotationally coupled to the tubular valve plate via a clutch mechanism; and a valve assembly positioned within a longitudinal opening extending along at least a portion of a sidewall of the tubular valve plate, the valve assembly configured to be activated by a pressure drop created by fluid flowing through the venturi profile.

24 Claims, 15 Drawing Sheets

VENTURI ACTIVATED DOWNHOLE TORQUE LIMITER

BACKGROUND

A common problem encountered in drilling and servicing hydrocarbon wells is found when using an assembly of pipe sections which steps down in diameter to extend into a relatively smaller diameter borehole below the larger main casing section. For example, in a "drillstring," or sets of tubing called a tubing string, a reduced diameter drillpipe and their threaded connections have lower torque specifications than a larger diameter drillpipe it may be connected to. It may therefore be desirable to limit the magnitude of the torque transferred to the reduced diameter section of drillpipe to prevent damage to the smaller pipe. As used herein, the term "torque" is used to refer to the turning force applied to an object measured in force-distance units.

Traditional downhole torque limiting systems employ shear pins or other elements, which are designed to fail when a specified torque is exceeded, allowing the pipe sections to rotate with respect to each other. To reset these devices, the tubing string must be removed from the well and the fractured pin replaced, which is undesirable and expensive. Alternatively, a weight may be inserted into the wellbore to reset the pipe sections, which is undesirable for other reasons.

BRIEF DESCRIPTION

Reference is now made to the following descriptions taken in conjunction with the accompanying drawings, in which.

DETAILED DESCRIPTION

Figure 1:
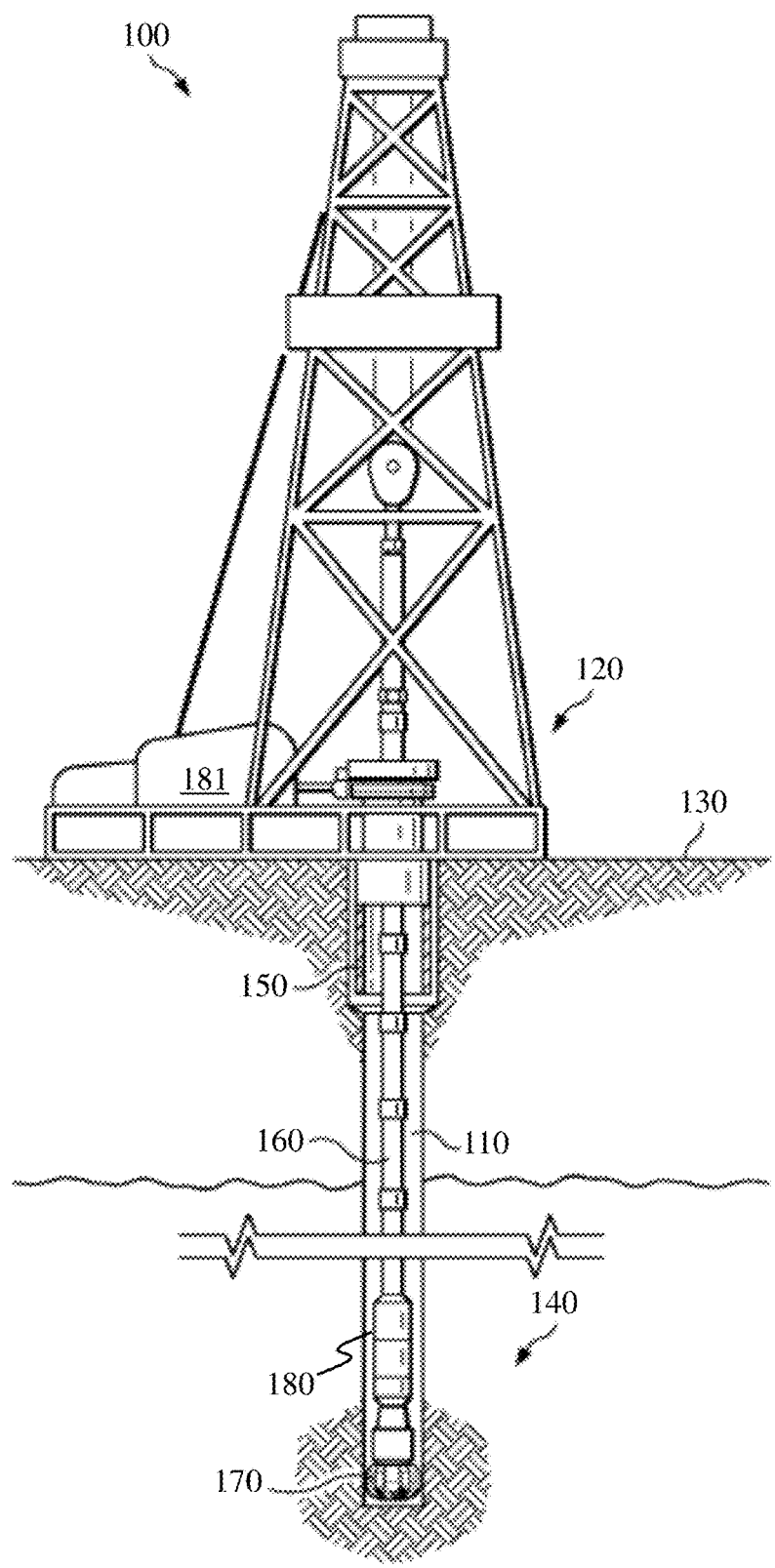
FIG. 1 illustrates a schematic partial cross-sectional view of an example well system for hydrocarbon reservoir production according to one or more embodiments disclosed herein.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to a direct interaction between the elements and may also include an indirect interaction between the elements described. Unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

Referring now to FIG. 1, illustrated is a schematic partial cross-sectional view of an example well system 100 for hydrocarbon reservoir production, according to certain example embodiments. The well system 100, in one or more embodiments, generally includes a substantially cylindrical wellbore 110 extending from a wellhead 120 at the surface 130 downward into the Earth and into one or more subterranean zones of interest (one subterranean zone of interest 140 shown). The subterranean zone 140 can correspond to a single formation, a portion of a formation, or more than one formation accessed by the well system 100, and a given well system 100 can access one, or more than one, subterranean zone 140. After some or all the wellbore 110 is drilled, a portion of the wellbore 110 extending from the wellhead 120 to the subterranean zone 140 may be lined with lengths of tubing, called casing 150. The depicted well system 100 is a vertical well, with the wellbore 110 extending substantially vertically from the surface 130 to the subterranean zone 140. The concepts herein, however, are applicable to many other different configurations of wells, including horizontal, slanted or otherwise deviated wells, and multilateral wells with legs deviating from an entry well.

A tubing string 160 is shown as having been lowered from the surface 130 into the wellbore 110. In some instances, the tubing string 160 may be a drillstring having a series of jointed lengths of tubing coupled together end-to-end and/or a continuous (e.g., not jointed) coiled tubing. The tubing string 160 may include one or more well tools, including a bottom hole assembly 170. The bottom hole assembly 170 can include, for example, a drill bit, a sand screen, a subsurface safety valve, a downhole sensor, an inflow control valve, a multilateral junction, a deflection wedge, or another type of production component. In the example shown, the wellbore 110 is being drilled. The wellbore 110 can be drilled in stages, and the casing 150 may be installed between stages. In some instances, the tubing string 160 is a completion string, a service string, coiled tubing, or another oilfield tubular. In one instance, the tubing string 160 is used to place a directional wedge (e.g., whipstock) for use in the construction of a multilateral junction.

In certain embodiments, there is a desire and/or need for a downhole torque limiter 180 associated with the tubing string 160. The downhole torque limiter 180, in some embodiments, may include a tubular housing and a pipe positioned within the tubular housing, the pipe transitioning from a larger inside diameter ($ID_L$) to a smaller inside diameter ($ID_S$), thereby forming a venturi profile having a first pressure zone ($Z_1$) and a second pressure zone ($Z_2$). A tubular valve plate may be radially positioned between the tubular housing and the pipe and rotationally fixed with the pipe. A lower sub may be rotationally fixed relative to the tubular vale plate and the pipe and may be rotationally coupled to the housing via a clutch mechanism. A valve assembly may be positioned within a longitudinal opening extending along at least a portion of a sidewall of the tubular valve plate, the valve assembly configured to be activated by a pressure drop created by fluid flowing through the venturi profile.

In some examples, the downhole torque limiter 180 may be used with tools run into the wellbore during well cleanup. The tubing string 160 may be placed in the wellbore 110. When fluid begins to flow through an internal diameter of the pipe of the downhole torque limiter 180, the venturi effect results in a high pressure in the first pressure zone ($Z_1$) and a low pressure in the second pressure zone ($Z_2$). The high pressure in the first pressure zone ($Z_1$) communicates with a third pressure zone ($Z_3$), which may result in a bypass valve of the valve assembly moving to closed position. The clutch mechanism may be able to translate rotation from the housing to the pipe (e.g., through the tubular valve plate) such that there may be no rotational resistance against the lower sub and no uphole force may be generated.

As rotation of the tubular valve plate and the lower sub relative to the housing increases, rotational obstruction may be encountered, and torque may begin to build at the clutch mechanism. Axial force may be generated by the clutch mechanism and may force the tubular valve plate (e.g., and the pipe coupled thereto) in an uphole direction, thereby disengaging the clutch mechanism from the lower sub. A sensor 181 positioned uphole may detect that rotation of the pipe and the tubular valve plate may have decreased or stopped. Once the sensor detects the decreased and/or stopped rotation of the pipe and the tubular valve plate, fluid may be substantially stopped from flowing into the pipe and the venturi effect may cause the pressure in the first pressure zone ($Z_1$) and in the second pressure zone ($Z_2$) may begin to equalize. As the pressure in the first pressure zone ($Z_1$) and in the second pressure zone ($Z_2$) begins to equalize (e.g., as a result of no fluid flowing within the pipe), the bypass valve in the valve assembly may return to an open position and the tubular valve plate may be pushed downhole (e.g., using an uphole spring). As the tubular valve plate is pushed downhole, the clutch mechanism may begin to re-engage the lower sub, thereby allowing any rotation of the tubular housing to translate to the tubular valve plate and pipe.

Figure 2:
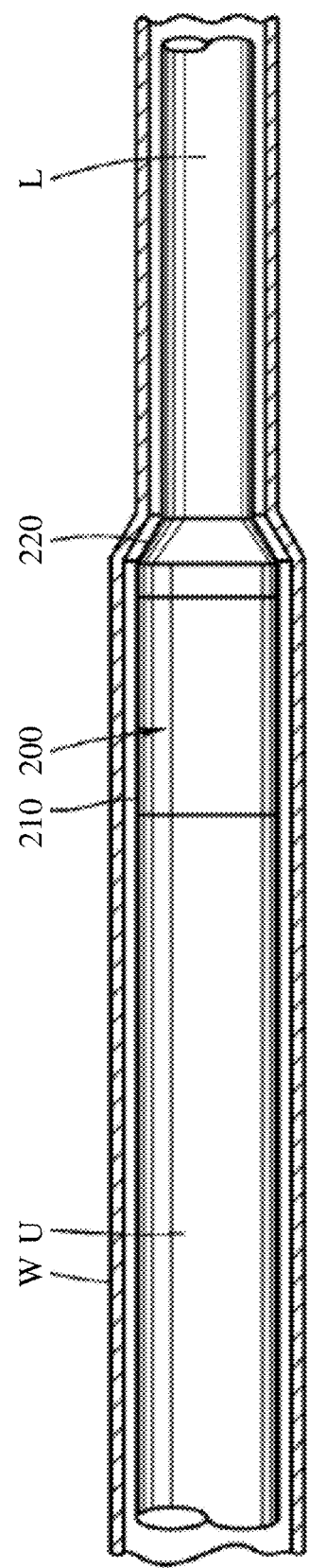
FIG. 2 illustrates one embodiment of a downhole torque limiter designed and manufactured according to one or more embodiments of the disclosure.

Turning to FIG. 2, illustrated is a downhole torque limiter 200 according to the present disclosure connected in a tubing string located in the wellbore W. Tubing string section, designated "U," is the upper section and the section designated "L" is the lower section. The term "tubing string" or "drill string" or "drill pipe" are used herein to refer to coil tubing, tubing, drill pipe or other tool deployment strings. While the example selected for explanation is tubing string, the torque limiter of the present invention can be used with tubing, casing, downhole tools, or any type of tubular members.

The downhole torque limiter 200 may have an upper driver end 210 and a lower driven end 220. Typically, upper driver end 210 and lower driven end 220 have threaded connections for making up the downhole torque limiter 200 within a tubing string, for example, a drill string. A central bore extends the length of the downhole torque limiter 200, to permit fluids to be pumped through the tool and down the tubing string.

Upper driver end 210, in one or more embodiments, is connected to upper section U by a threaded connection. In the illustrated example, the upper section U is connected to the surface rig and can be raised, lowered, and rotated thereby. Lower driven end 220 is connected to the lower section L, which in some embodiments, may include a reduced diameter. As is typical, a smaller diameter wellbore casing can be present, necessitating the use of the reduced diameter lower section L to access the smaller diameter wellbore casing. In the illustrated embodiment, the downhole torque limiter 200 connects upper U and lower L sections together and transmits rotational movement and torque to lower section L.

As will be explained in detail, the downhole torque limiter 200 can be set up to allow the upper driver end 210 and the lower driven end 220 to slip with respect to each other when the magnitude of the torque applied to the downhole torque limiter 200 exceeds the preset limit. Thus, when the torque applied by an uphole rig while rotating upper section U exceeds a specified limit, the downhole torque limiter 200 will allow the upper driver end 210 and the lower driven end 220 to slip. According to a particular feature of the present invention, when rotation of the upper driver end 210 ceases or is reduced, the downhole torque limiter 200 will reset such that the ends no longer slip with respect to each other, and rotational movement and torque will again be transferred to lower section L.

Figure 3A:
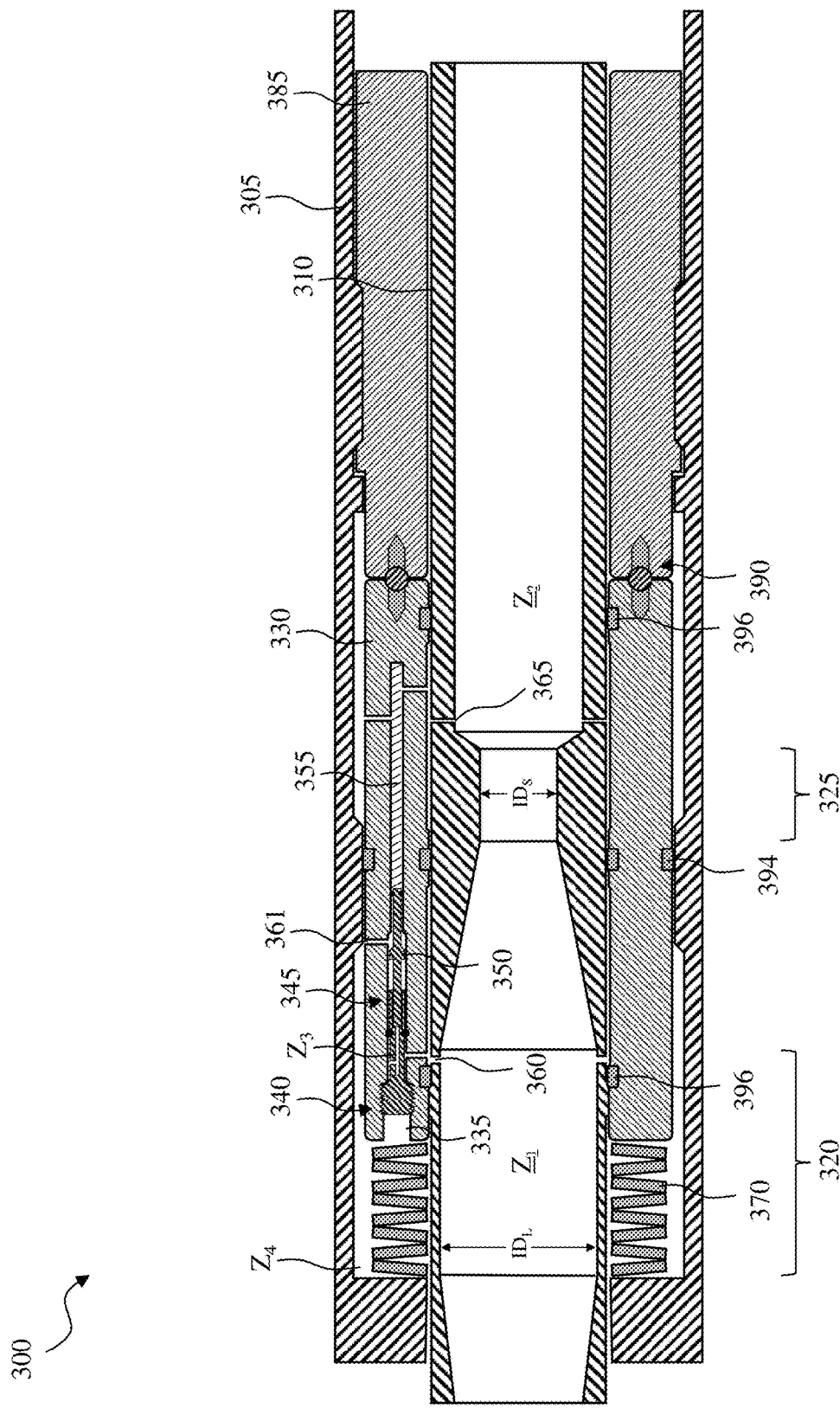
FIGS. 3A through 3C illustrate another embodiment of a downhole torque limiter designed and manufactured according to one or more embodiments of the disclosure.
Figure 3B:
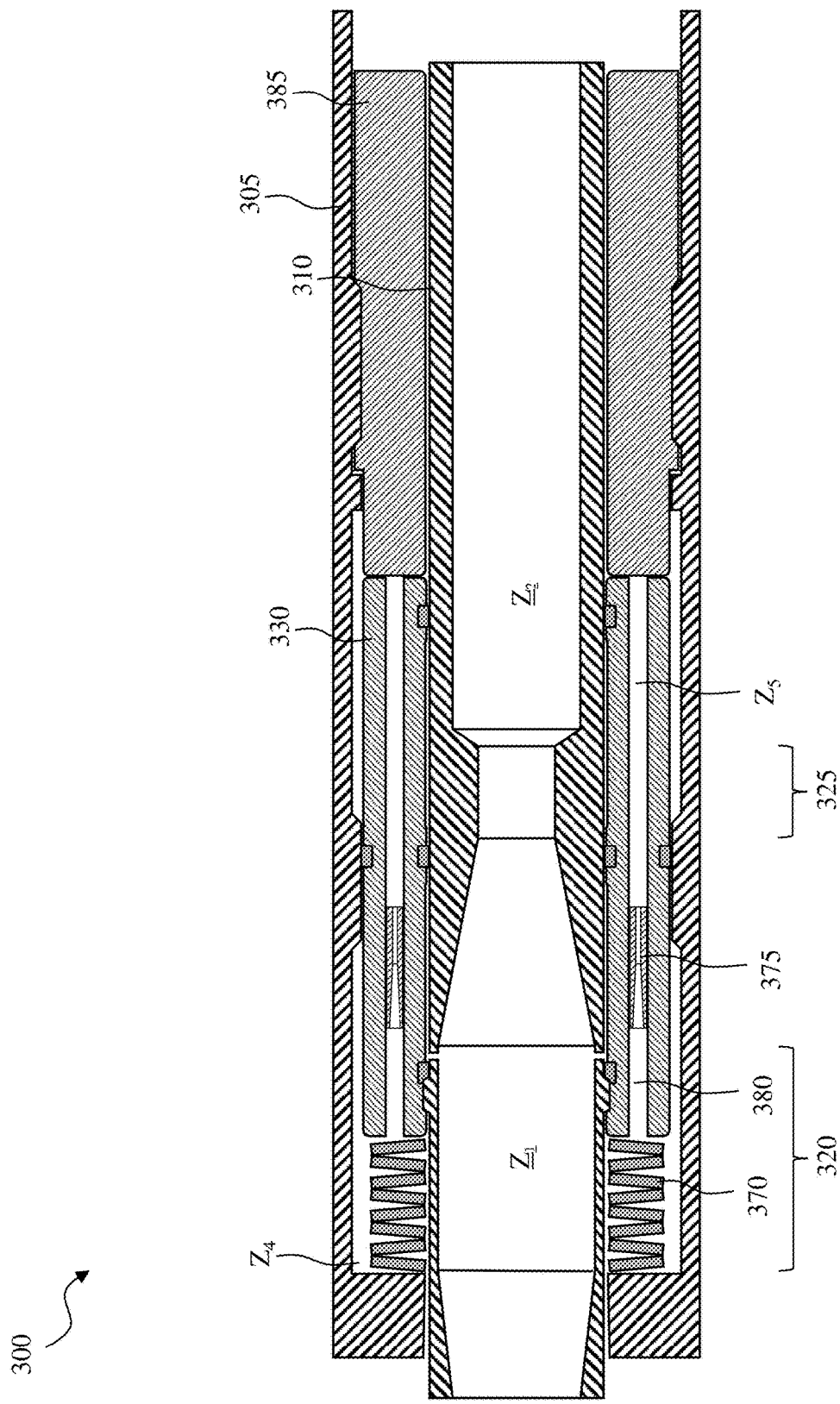
Figure 3C:
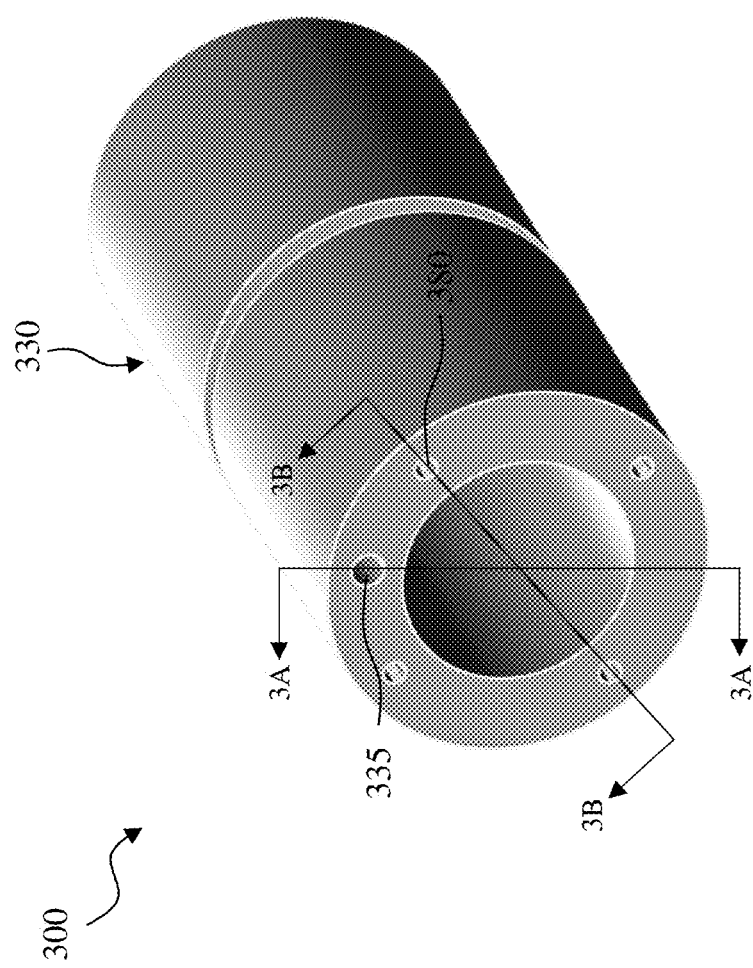

Referring now to FIGS. 3A through 3C, there is shown two sectional views and a perspective view of a downhole torque limiter 300 designed and manufactured according to one or more embodiments of the disclosure. The embodiment of FIGS. 3A through 3C illustrate the downhole torque limiter 300 in a steady state, such as it would exist prior to being installed within a well system. The downhole torque limiter 300 may include a tubular housing 305. A pipe 310 may be positioned within the tubular housing 305. The pipe 310, in some embodiments, may be a mandrel. In some embodiments, the pipe 310 may transition from at least a first portion 320 having larger inside diameter ($ID_L$) to second portion 325 having a smaller inside diameter ($ID_S$). The first portion 320 having larger inside diameter ($ID_L$) and the second portion 325 having a smaller inside diameter ($ID_S$) may thereby form a venturi profile having a first pressure zone ($Z_1$) and a second pressure zone ($Z_2$).

In the illustrated embodiment, a tubular valve plate 330 may be radially positioned between the tubular housing 305 and the pipe 310 and rotationally fixed with the pipe 310. In this embodiment, a lower sub 385 may be rotationally fixed relative to the tubular housing 305 and rotationally coupled to the tubular valve plate 330 via a clutch mechanism 390. In some embodiments, a valve assembly 340 may be positioned within a longitudinal opening 335 extending along at least a portion of a sidewall of the tubular valve plate 330. The valve assembly 340 may be configured to be activated by a pressure drop created by fluid flowing through the venturi profile of the pipe 310. In some embodiments, the valve assembly 340 may include a bypass valve 345, the bypass valve 345 including bypass valve piston 350 and a bypass valve return spring 355. In some embodiments, the bypass valve piston 350 may define a third pressure zone ($Z_3$) configured to move the bypass valve piston 350 to a closed position or an open position to close or open a fourth pressure zone ($Z_4$) based upon a pressure differential across the first pressure zone ($Z_1$) and the second pressure zone ($Z_2$). In some embodiments, at least a first bypass port 360 may be positioned within the first pressure zone ($Z_1$), a second bypass port 365 may be positioned within the second pressure zone ($Z_2$), and a third bypass port 361 may be positioned in the fourth pressure zone ($Z_4$), the bypass valve piston 350 opening and closing the third bypass port 361 based upon a pressure differential across the first pressure zone ($Z_1$) and the second pressure zone ($Z_2$). The first and second bypass ports 360 and 365 may, in some embodiments, provide fluid communication between the internal diameter of the pipe 310 and the tubular valve plate 330. In some embodiments the fourth pressure zone ($Z_4$) may include a spring 370 positioned between a shoulder of the tubular housing and a face of the tubular valve plate 330. In some embodiments, the spring 370 may be a Bellevue spring.

The downhole torque limiter 300 illustrated in FIG. 3A, in one or more embodiments, includes an inner venturi mandrel. The downhole torque limiter 300, in this embodiment, additionally includes a rotational/axial seal 394. Further to the embodiment of FIG. 3A, the downhole torque limiter 300 further includes a backup seal system 396 (e.g., O-ring type non-rotational seals).

Referring now to FIG. 3B, there is another section view of the downhole torque limiter 300, shown rotated from the view shown in FIG. 3A. In some embodiments, the downhole torque limiter 300 may include one or more one-way check valves 375 located in one or more additional longitudinal openings 380 extending along an entirety of the sidewall of the tubular valve plate 330. The one or more check valves 375 may separate the fourth pressure zone ($Z_4$) from a fifth pressure zone ($Z_5$). In some embodiments, the one or more one-way check valves 375 may allow fluid to pass from the fourth pressure zone ($Z_4$) to the fifth pressure zone ($Z_5$) but not from the fifth pressure zone ($Z_5$) to the fourth pressure zone ($Z_4$). In other embodiments, the one or more one-way check valves 375 may only allow fluid to pass from the fourth pressure zone ($Z_4$) to the fifth pressure zone ($Z_5$) when subjected to a minimum check valve pressure.

Referring now to FIG. 3C, there is shown a perspective view of the tubular valve plate 330 of the downhole torque limiter 300. As shown, the longitudinal opening 335 may run through at least a portion of the valve plate 330 positioned within the tubular housing 305. As discussed herein, the valve assembly 340 may be positioned within the longitudinal opening 335. Similarly, the one or more additional longitudinal openings 380 may extend along the sidewall of the tubular valve plate 330 and the one or more check valves 375 may be positioned therein.

Figure 4A:
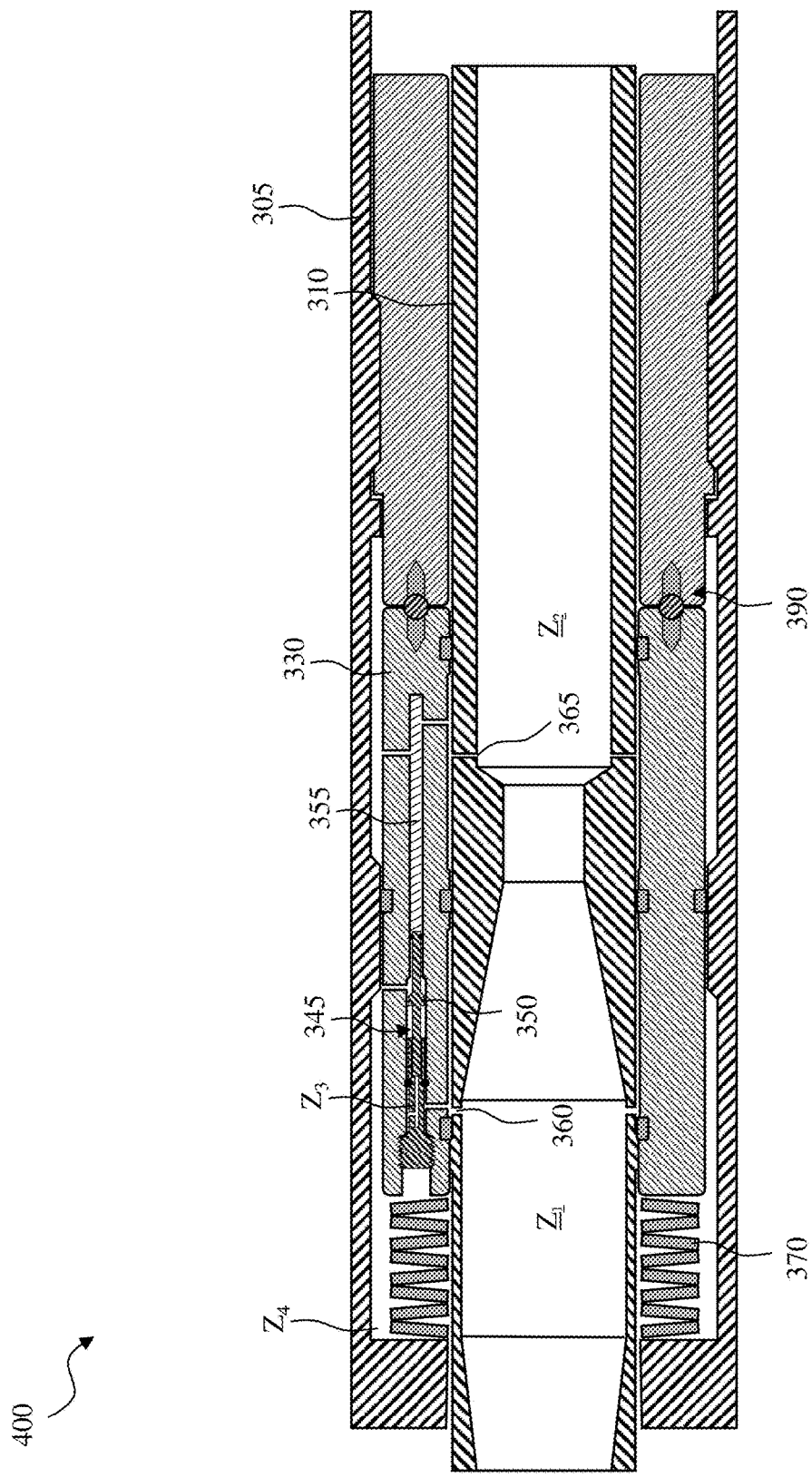
FIGS. 4A and 4B illustrate the downhole torque limiter shown in FIGS. 3A-3C in its steady state, such as it would exist prior to being installed within a well system.

Turning to FIGS. 4A through 8B, illustrated are various different operational states for a downhole torque limiter 400 designed, manufactured and/or operated according to one or more embodiments of the disclosure. Accordingly, like reference numbers have been used to indicate similar, if not identical, features. FIGS. 4A and 4B illustrate the downhole torque limiter 400 in its steady state, such as it would exist prior to being installed within a well system. In this state, neither the tubular housing 305 nor the pipe 310 are being rotation. Furthermore, no fluid is being pumped down the pipe 310. Accordingly, the bypass valve 345 is open. Given these circumstances, the first through fifth pressure zones ($Z_1$ through $Z_5$) are substantially equal (within about 0-10% of equal). Moreover, the spring 370 is keeping the clutch mechanism 390 engaged, and thus the tubular housing 305 and the tubular valve plate 330 and pipe 310 are rotationally coupled to one another.

Figure 4B:
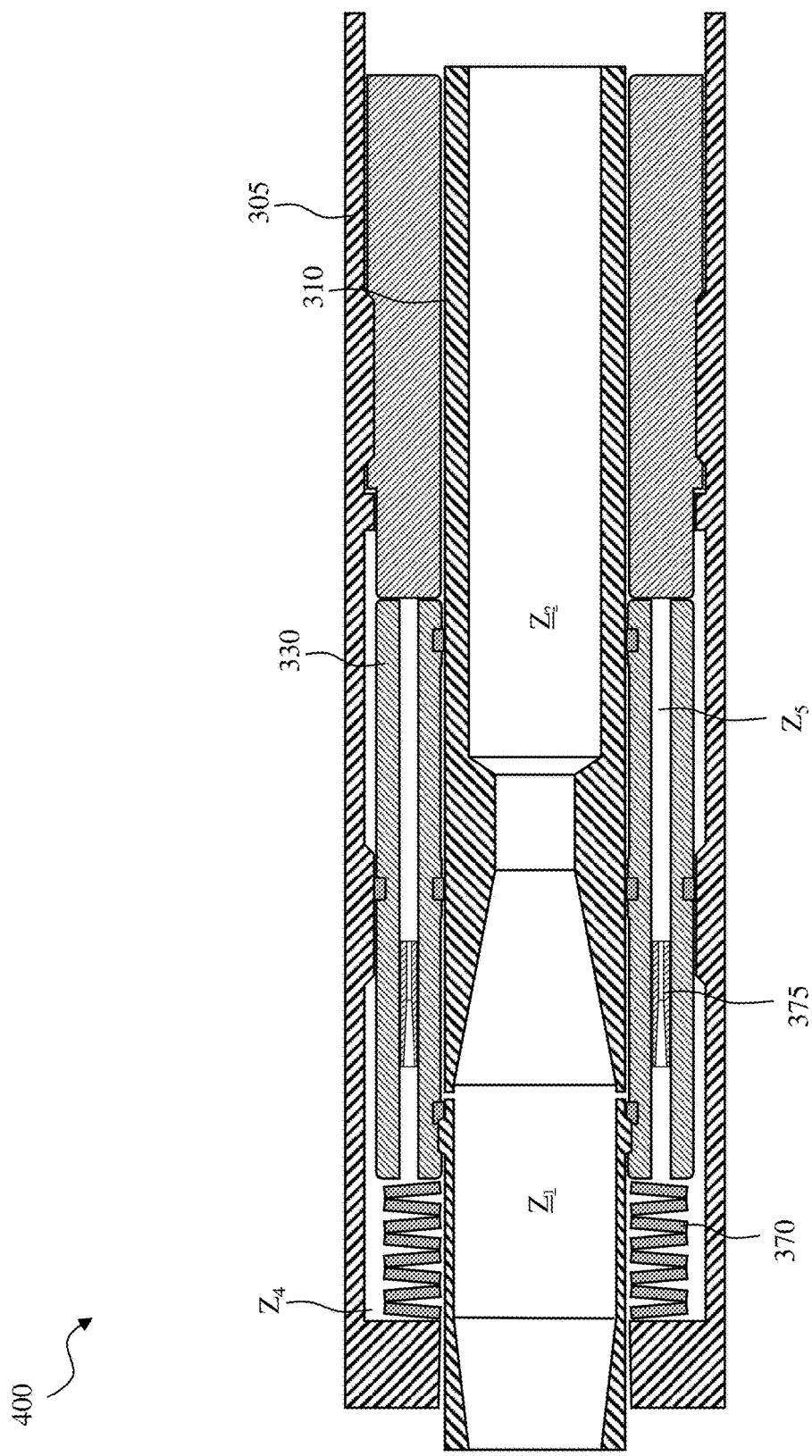

As shown in FIG. 4B, the one or more one-way check valves 375 may be in a closed position.

Figure 5A:
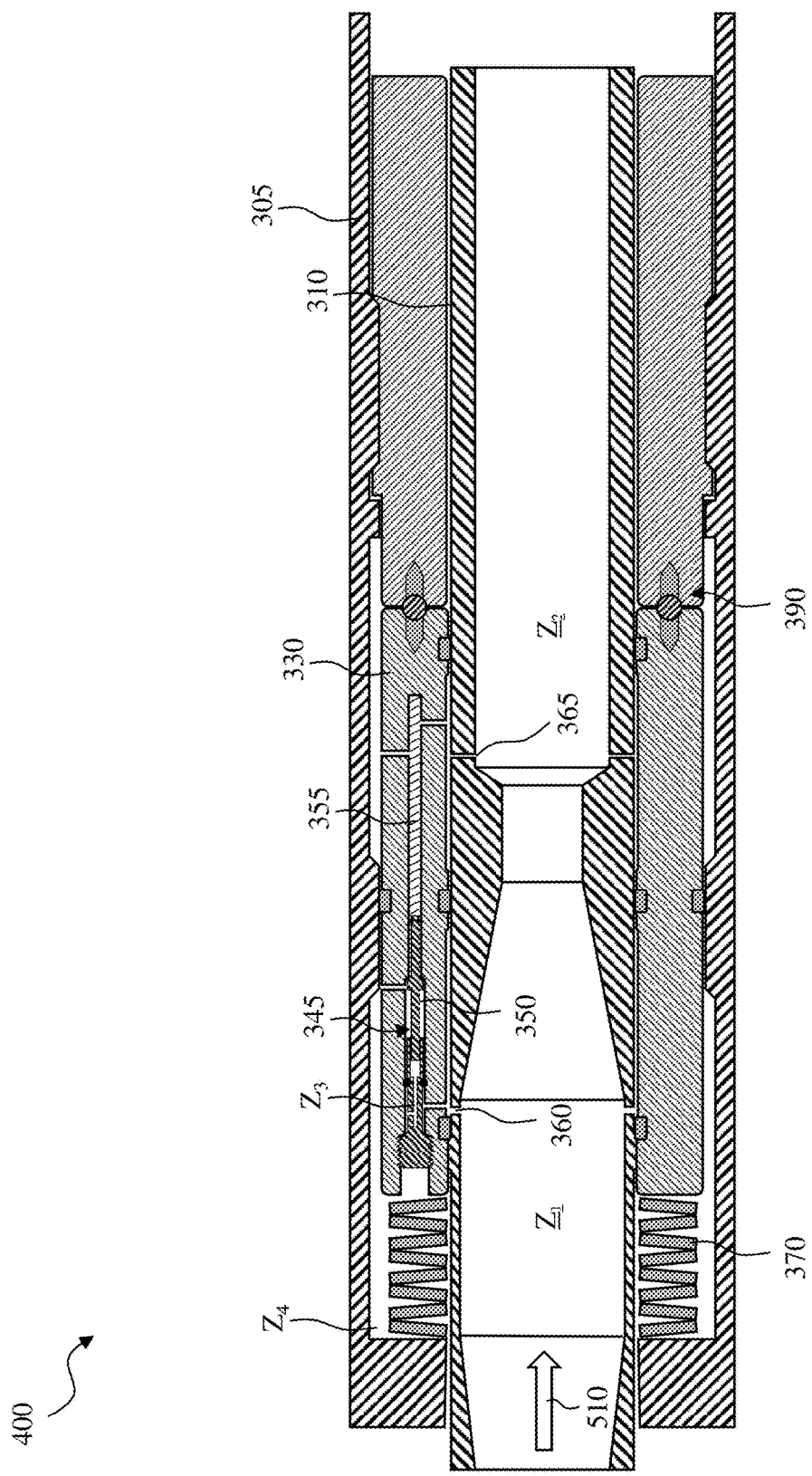
FIGS. 5A and 5B illustrate the downhole torque limiter shown in FIGS. 3A-3C in a run-in-hole (RIH) state (e.g., an engaged state)
Figure 5B:
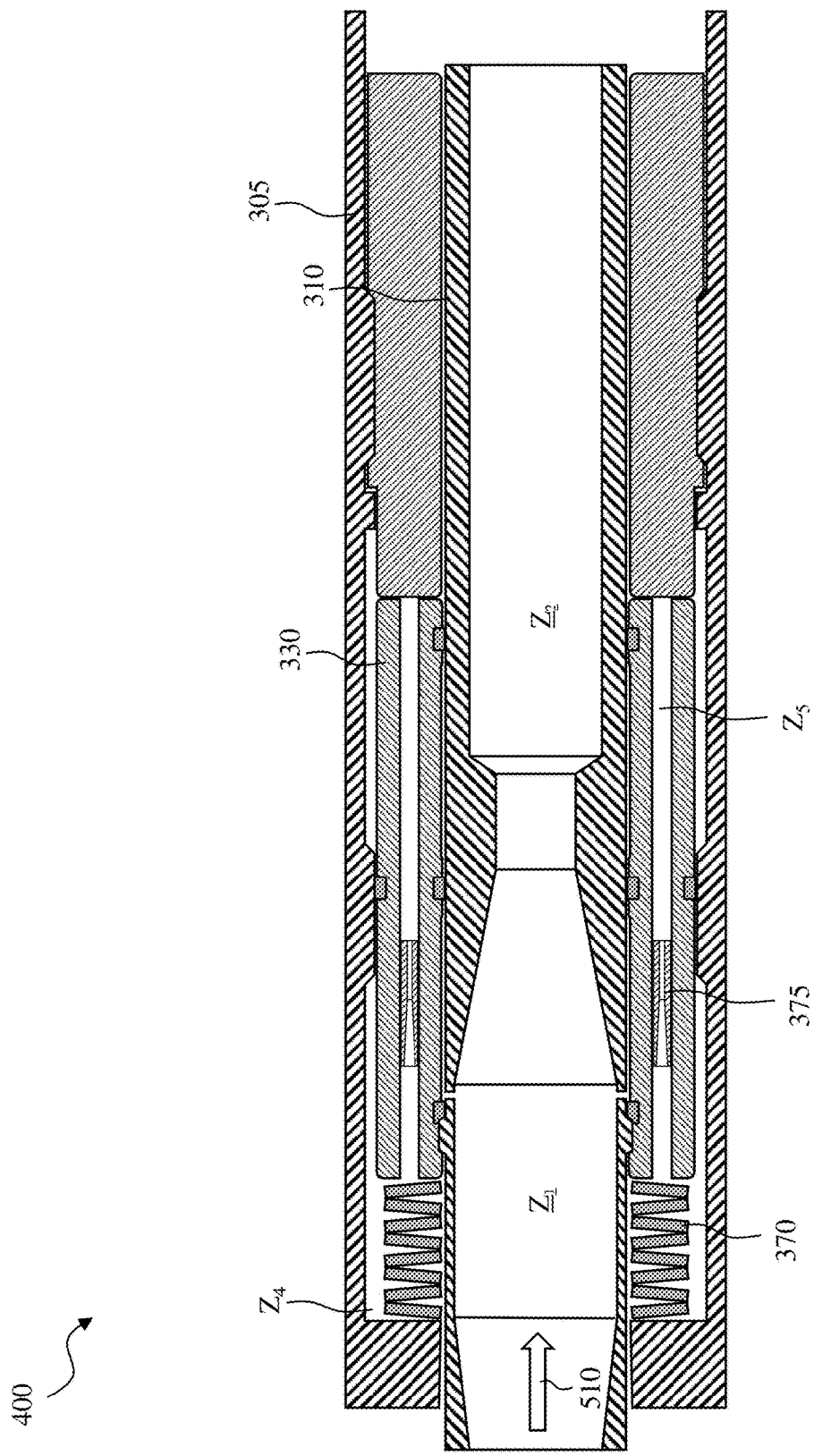

Referring to FIGS. 5A and 5B, there is shown the downhole torque limiter 400 shown in the run-in-hole (RIH) state (e.g., an engaged state), wherein fluid 510 is being run into the wellbore through the pipe 310. Referring to FIG. 5A, as the fluid 510 flows through the internal diameter of the pipe 310, the venturi effect results in a high pressure in the first pressure zone ($Z_1$) and a low pressure in the second pressure zone ($Z_2$). The high pressure in the first pressure zone ($Z_1$) communicates with the third pressure zone 3 ($Z_3$) through the first bypass port 360. The pressure in third pressure zone 3 ($Z_3$) may overcome the bypass valve return spring 355 and close the bypass valve 345. At this state, the tubular housing 305 and the tubular valve plate 330 and pipe 310 are still rotationally coupled to one another. For example, the clutch mechanism 390 is still translating rotation of the housing 305 to the tubular valve plate 330 and pipe 310. As there is little rotational resistance against the pipe 310, no uphole forces is being generated upon the tubular valve plate 330 from the clutch mechanism 390.

Referring to FIG. 5B, as the one-way check valves 375 remains closed (e.g., a sufficient pressure within the fourth pressure zone ($Z_4$) has not been generated to open the one-way check valve 375), and the bypass valve 345 is in the closed state, the fourth pressure zone ($Z_4$) is full of a fixed amount of fluid.

Figure 6A:
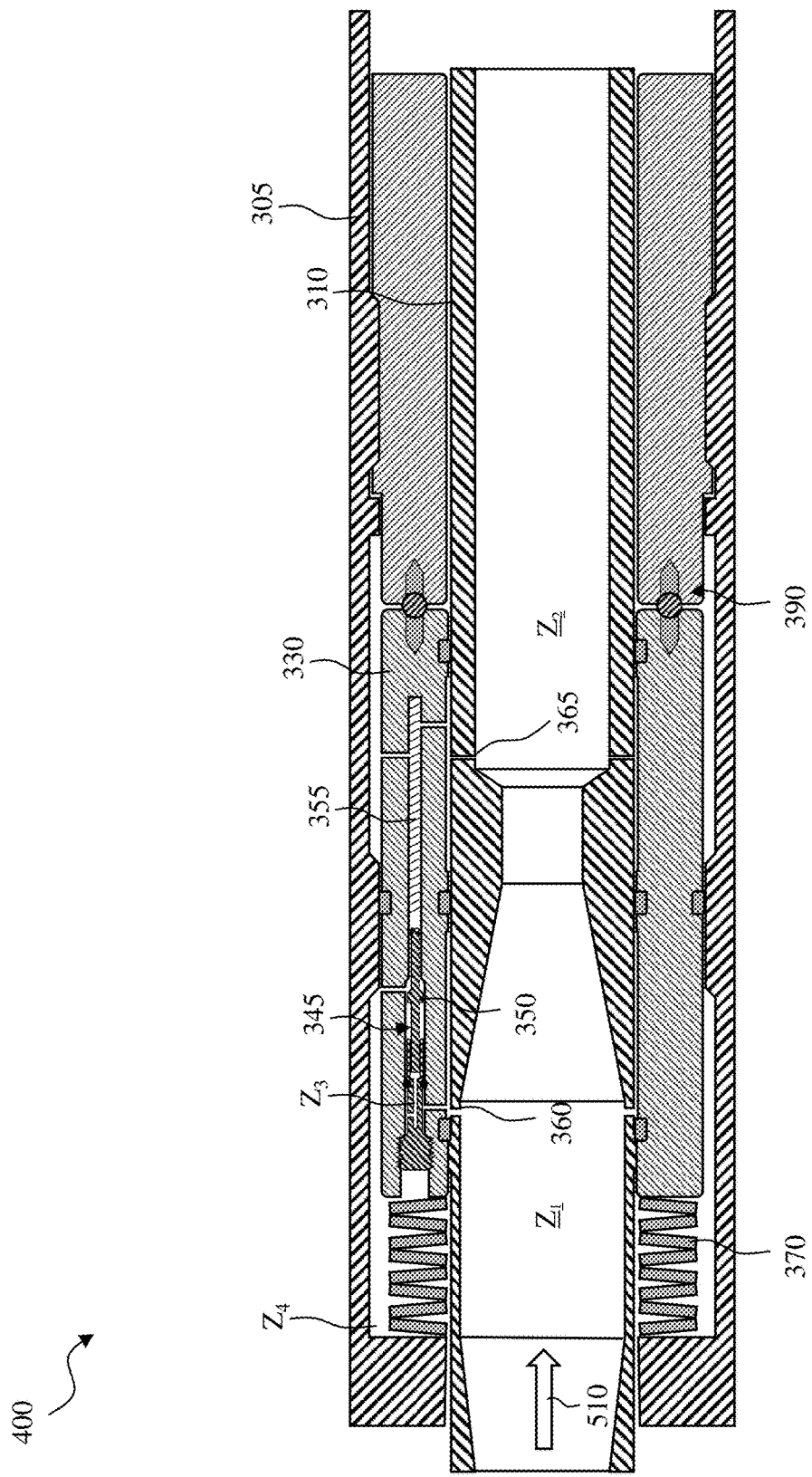
FIGS. 6A and 6B illustrate downhole torque limiter shown in FIGS. 3A-3C in in a first disengaged state (e.g., partially disengaged state)
Figure 6B:
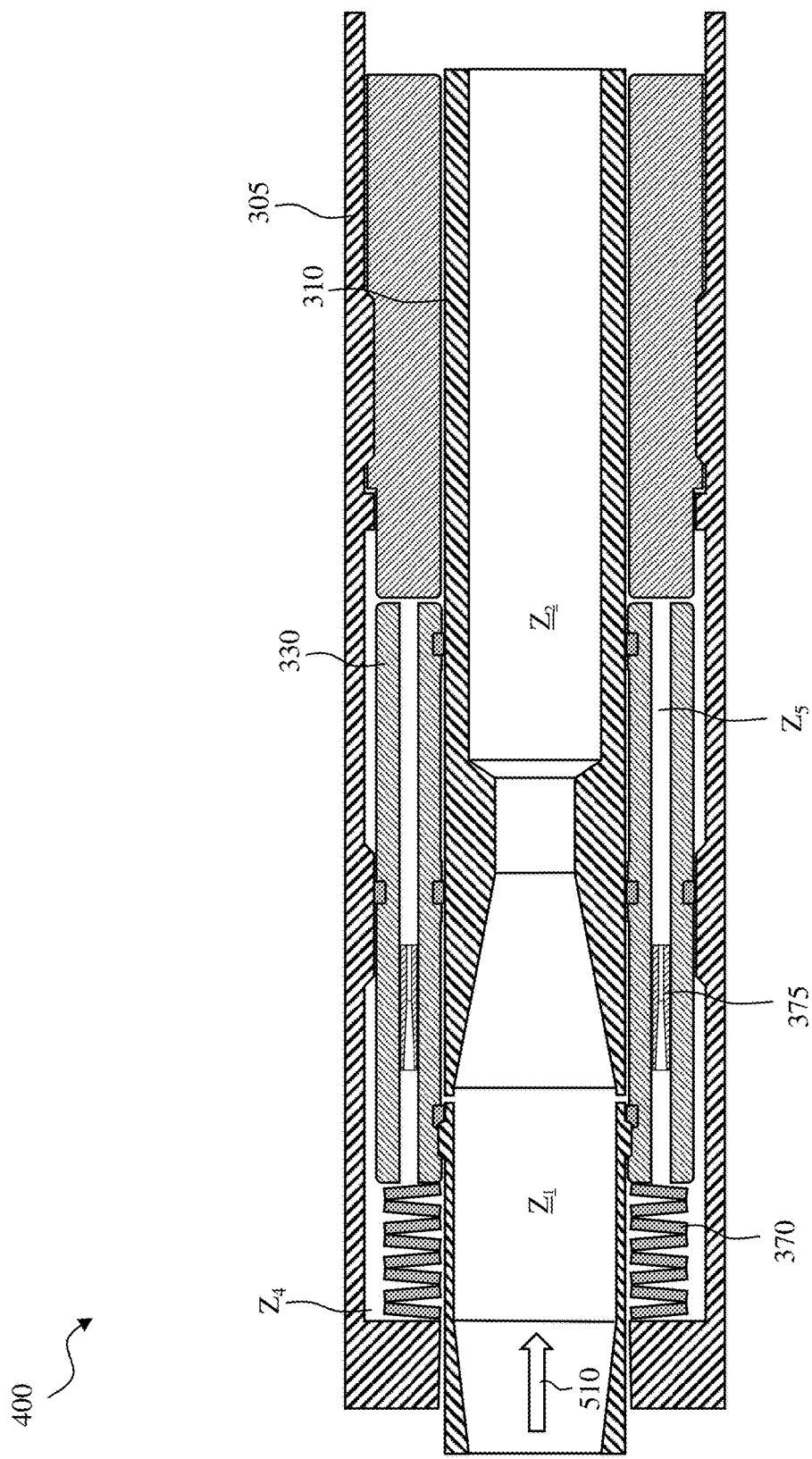

Referring to FIGS. 6A and 6B, there is shown the downhole torque limiter 400 in a first disengaged state (e.g., partially disengaged state). Referring to FIG. 6A, when the pipe 310 encounters a rotational obstruction, torque may begin to build at the clutch mechanism 390. When this occurs, the clutch mechanism 390 begins forcing the tubular valve plate 330, and thus the pipe 310 fixed thereto, uphole. This uphole movement of the tubular valve plate 330 attempts to compress the fixed amount of the fluid within the fourth pressure zone ($Z_4$), thereby increasing the pressure of the fluid within the fourth pressure zone ($Z_4$). The one or more check valves 375 are set to remain closed until a specified pressure of the fluid within the fourth pressure zone ($Z_4$) is attained, at which point they open and allow at least a portion of the fluid to travel to the fifth pressure zone ($Z_5$). The embodiment of FIGS. 6A and 6B illustrate the downhole torque limiter 400 at the point when the pressure of the fluid within the fourth pressure zone ($Z_4$) is beginning to build, but has yet to trigger open the one or more check valves 375.

Figure 7A:
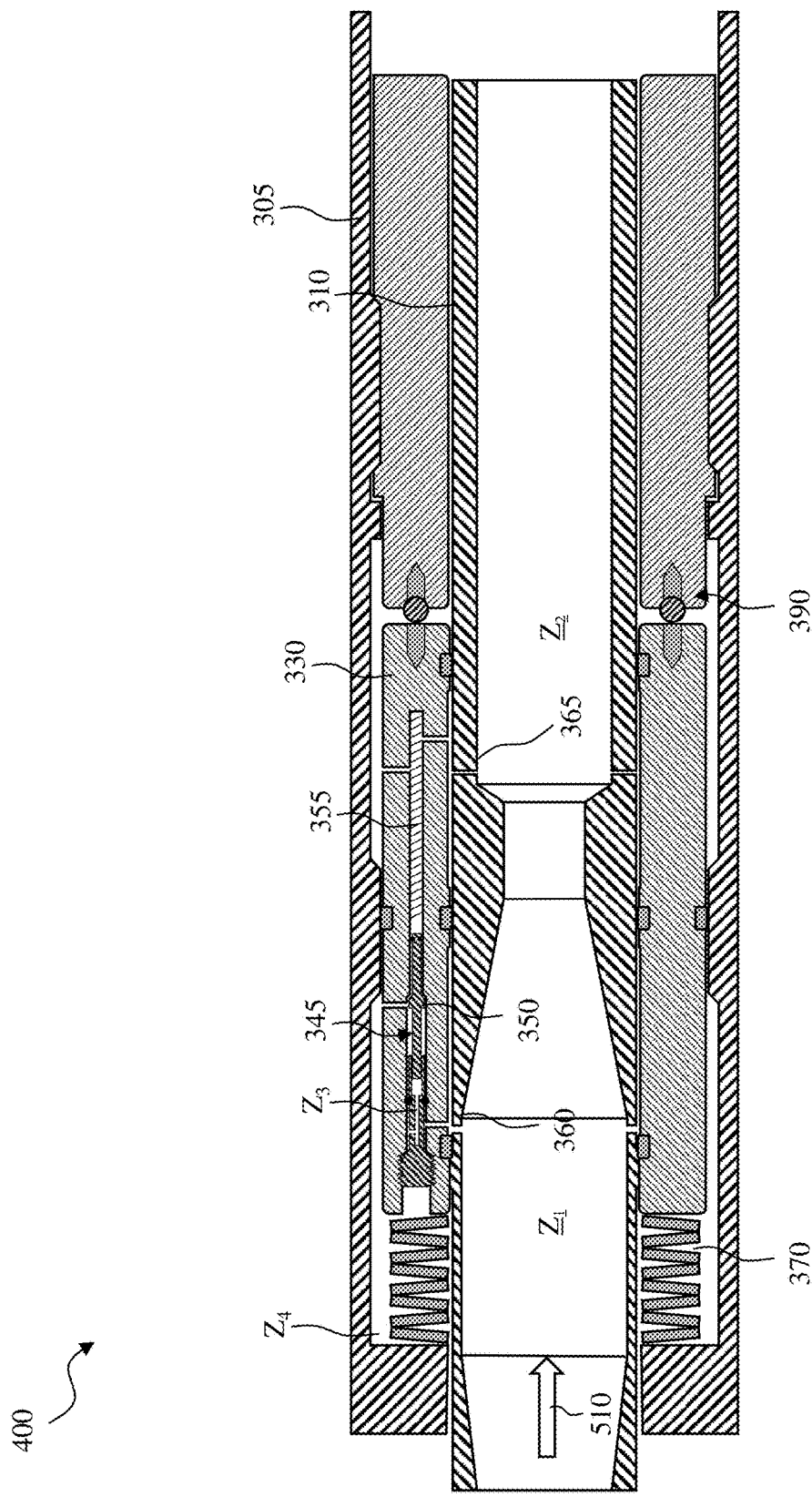
FIGS. 7A and 7B illustrate downhole torque limiter shown in FIGS. 3A-3C in a second disengaged state (e.g., fully disengaged state)
Figure 7B:
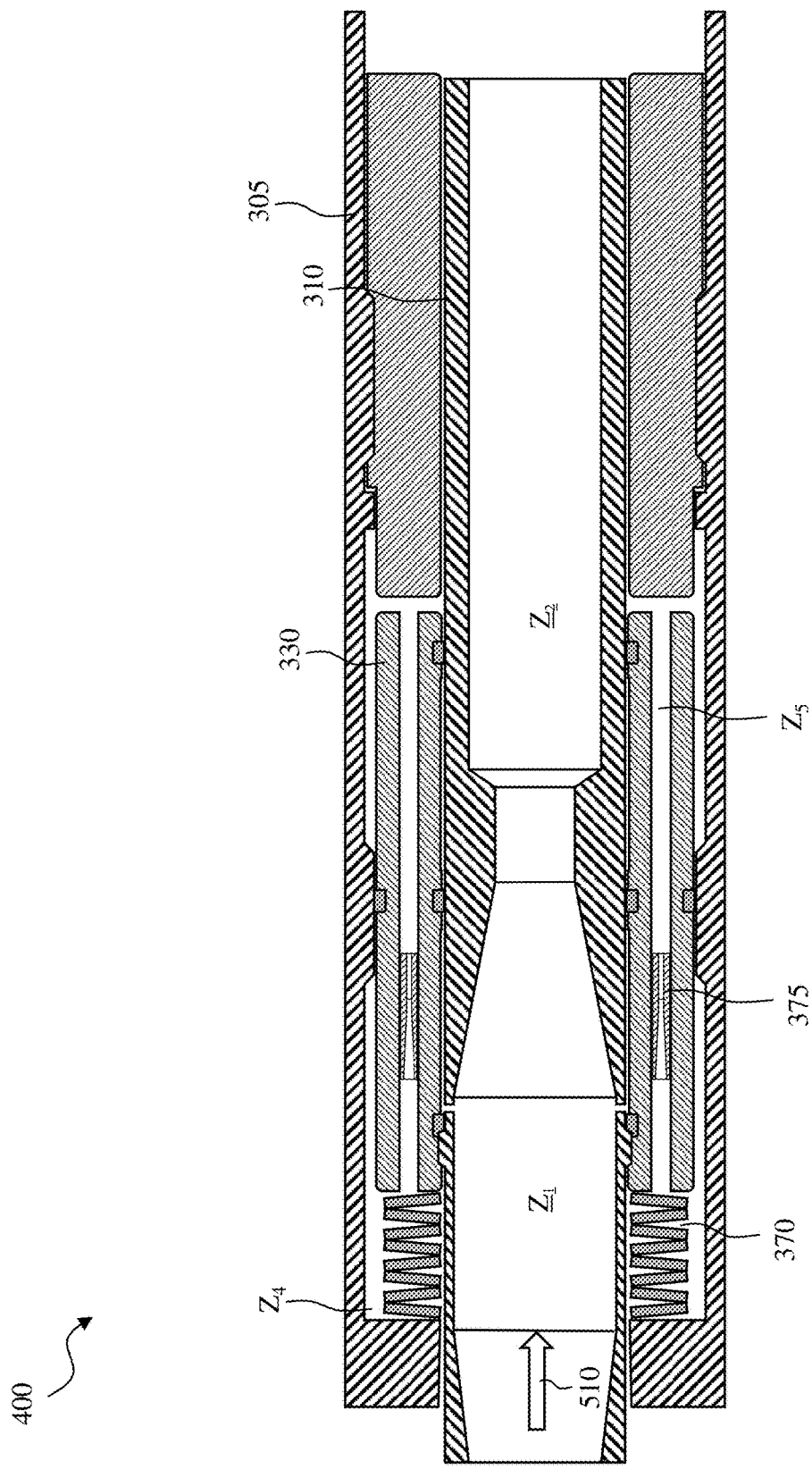

Referring to FIGS. 7A and 7B, there is shown the downhole torque limiter 400 in a second disengaged state (e.g., fully disengaged state), such as if the clutch mechanism 390 is slipping, and thus the tubular housing 305 and the tubular valve plate 330 and pipe 310 are no longer rotationally coupled to one another. In this state, the pressure of the fluid within the fourth pressure zone ($Z_4$) has built to a level, so as to trigger open the one or more check valves 375. Accordingly, the excess pressure of the fluid within the fourth pressure zone ($Z_4$) moves to the fifth pressure zone ($Z_5$). In this state, the bypass valve 345 remains closed, and fluid cannot travel back from the fifth pressure zone ($Z_5$) to the fourth pressure zone ($Z_4$) because of the one or more check valves 375. What results is a hydraulic lock that prevents the tubular valve plate 330 from overcoming a spring force of the spring 370 and moving back into its original run-in-hole position (as shown in FIG. 5A). The downhole torque limiter 400 will remain in this state until the hydraulic lock is removed, which is only possible if the bypass valve 345 were to open. Furthermore, as the fluid 510 is still being supplied down the pipe 310, the high pressure in the first pressure zone ($Z_1$) and lower pressure in the second pressure zone ($Z_2$) keep the bypass valve 345 closed.

Figure 8A:
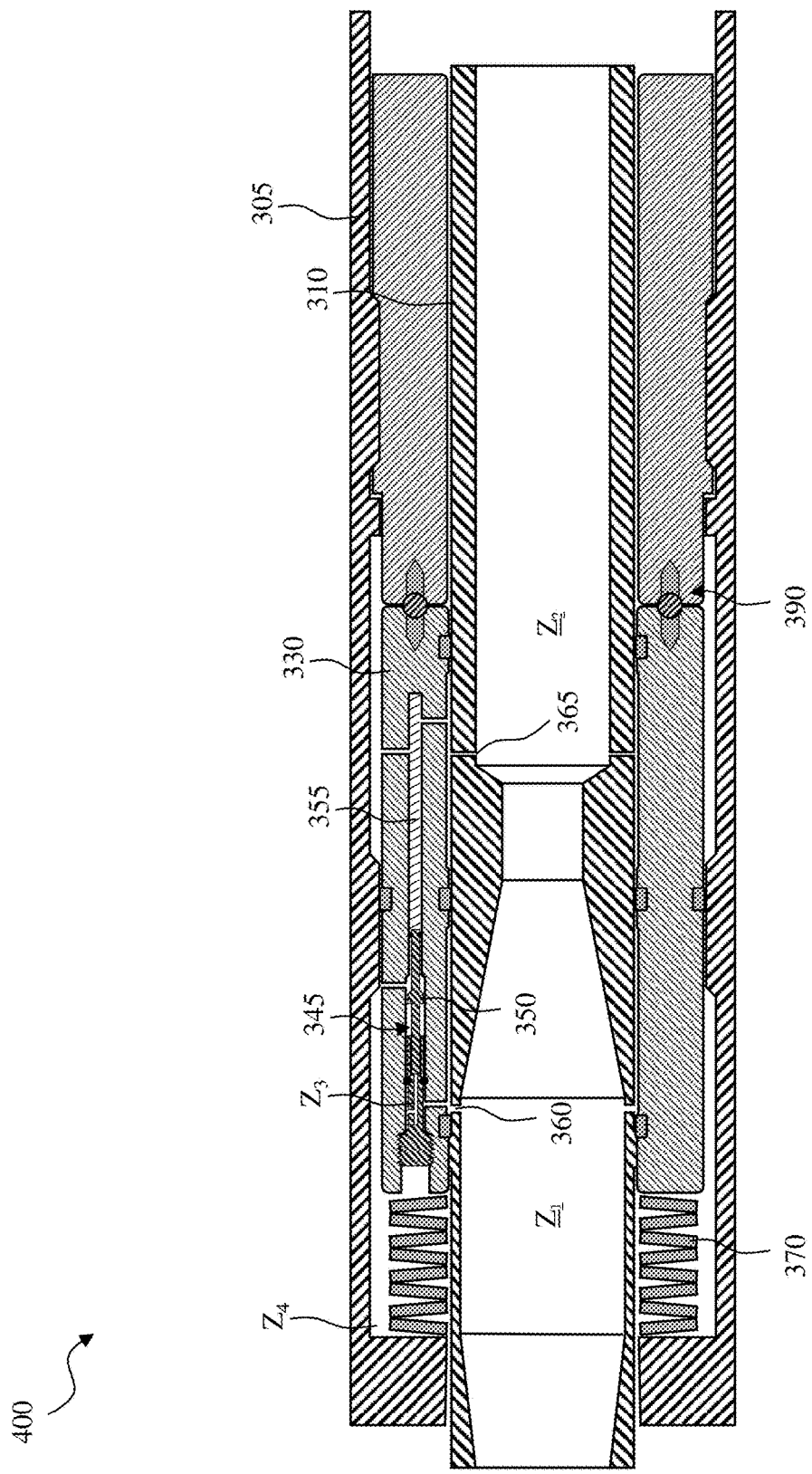
FIGS. 8A and 8B illustrate downhole torque limiter shown in FIGS. 3A-3C in a re-engaged state (e.g., in a run-in-hole (RIH) state.
Figure 8B:
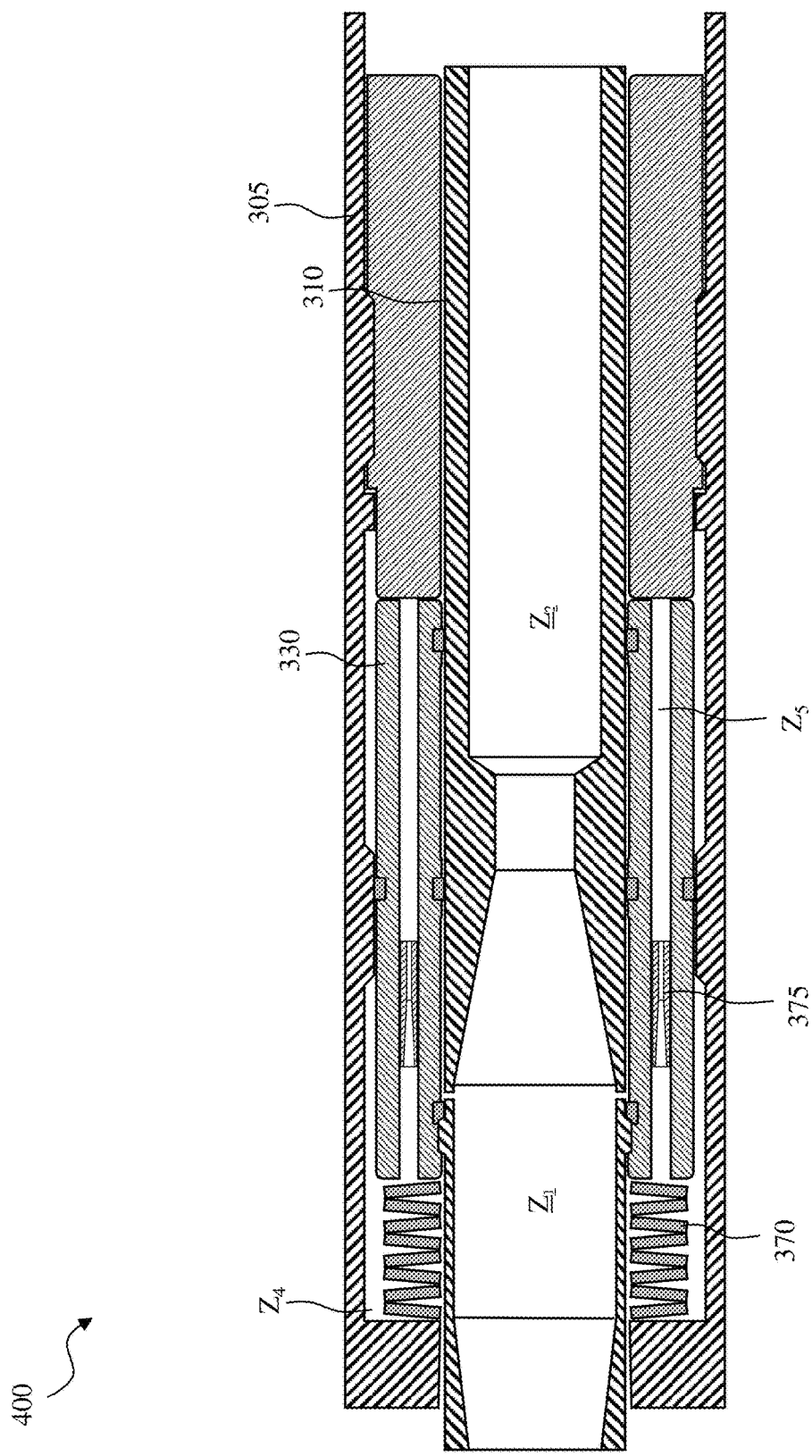

Referring to FIGS. 8A and 8B, there is shown the downhole torque limiter 400 in a re-engaged state, such as what might result if a sensor, which may be positioned uphole at or near a surface of the wellbore, detected that the rotation of the tubular valve plate 330 has stopped, and the operator of the tool stopped supplying the fluid down the pipe 310. When the fluid is no longer supplied down the pipe 310, the first pressure zone ($Z_1$) and the second pressure zone ($Z_2$) begin to equalize. Once the first pressure zone ($Z_1$) and the second pressure zone ($Z_2$) are sufficiently equalized, the bypass valve return spring 355 returns the bypass valve 345 to its open state (e.g., from the closed state shown in FIGS. 7A and 7B). Accordingly, the spring 370 pushes the tubular valve plate 330 downhole, reengaging the clutch mechanism 390. Accordingly, at this stage, the tubular housing 305, the tubular valve plate 330 and the pipe 310 are again rotationally fixed with respect to one another.

Aspects disclosed herein include:
A. A downhole torque limiter, the downhole torque limiter including: 1) a tubular housing; 2) a pipe positioned within the tubular housing, the pipe transitioning from a larger inside diameter ($ID_L$) to a smaller inside diameter ($ID_S$), thereby forming a venturi profile having a first pressure zone ($Z_1$) and a second pressure zone ($Z_2$); 3) a tubular valve plate radially positioned between the tubular housing and the pipe and rotationally fixed with the pipe; 3) a lower sub rotationally fixed relative to the tubular housing and rotationally coupled to the tubular valve plate via a clutch mechanism; and 3) a valve assembly positioned within a longitudinal opening extending along at least a portion of a sidewall of the tubular valve plate, the valve assembly configured to be activated by a pressure drop created by fluid flowing through the venturi profile.
B. A well system, the well system including: 1) a wellbore; 2) a tubing string positioned within the wellbore; and 3) a torque limiter coupled with the tubing string, the torque limiter including: a) a tubular housing; b) a pipe positioned within the tubular housing, the pipe transitioning from a larger inside diameter ($ID_L$) to a smaller inside diameter ($ID_S$), thereby forming a venturi profile having a first pressure zone ($Z_1$) and a second pressure zone ($Z_2$); c) a tubular valve plate radially positioned between the tubular housing and the pipe and rotationally fixed with the pipe; d) a lower sub rotationally fixed relative to the tubular housing and rotationally coupled to the tubular valve plate via a clutch mechanism; and e) a valve assembly positioned within a longitudinal opening extending along at least a portion of a sidewall of the tubular valve plate, the valve assembly configured to be activated by a pressure drop created by fluid flowing through the venturi profile.
C. A method for limiting torque in a well system, the method including: 1) running a downhole torque limiter into a wellbore, the downhole torque limiter coupled with at least a tubing string and including: a) a tubular housing; b) a pipe positioned within the tubular housing, the pipe transitioning from a larger inside diameter ($ID_L$) to a smaller inside diameter ($ID_S$), thereby forming a venturi profile having a first pressure zone ($Z_1$) and a second pressure zone ($Z_2$); c) a tubular valve plate radially positioned between the tubular housing and the pipe and rotationally fixed with the pipe; d) a lower sub rotationally fixed relative to the tubular housing and rotationally coupled to the tubular valve plate via a clutch mechanism; e) a valve assembly positioned within a longitudinal opening extending along at least a portion of a sidewall of the tubular valve plate, the valve assembly configured to be activated by a pressure drop created by fluid flowing through the venturi profile; and f) a pressure relief valve configured to allow fluid from the radial exterior of the one or more clutch mechanisms to move to a radial interior of the of the one or more clutch mechanisms upon failure of the fluid control system and sensing a high-pressure situation; 2) sensing a high pressure on the radial exterior of the one or more clutch mechanisms; and 3) activating a bypass valve assembly to move the valve plate uphole and disengage from the lower sub, the bypass valve assembly includes a bypass valve piston and a bypass valve return spring, the bypass valve piston defining a third pressure zone ($Z_3$) configured to move the bypass valve piston to a closed position or open position to close or open a fourth pressure zone ($Z_4$) based upon a pressure differential across the first pressure zone ($Z_1$) and the second pressure zone ($Z_2$).

Aspects A, B, and C may have one or more of the following additional elements in combination: Element 1, wherein the valve assembly includes a bypass valve piston and a bypass valve return spring, the bypass valve piston defining a third pressure zone ($Z_3$) configured to move the bypass valve piston to a closed position or open position to close or open a fourth pressure zone ($Z_4$) based upon a pressure differential across the first pressure zone ($Z_1$) and the second pressure zone ($Z_2$). Element 2, wherein the fourth pressure zone ($Z_4$) includes a spring positioned between a shoulder of the tubular housing and a face of the tubular valve plate. Element 3, wherein the spring is a Bellevue spring. Element 4, further including one or more one-way check valves located in one or more additional longitudinal openings extending along an entirety of the sidewall of the tubular valve plate, the one or more check valves separating the fourth pressure zone ($Z_4$) and a fifth pressure zone ($Z_5$). Element 5, wherein the one or more one-way check valves allow fluid to pass from the fourth pressure zone ($Z_4$) to the fifth pressure zone ($Z_5$) but not from the fifth pressure zone ($Z_5$) to the fourth pressure zone ($Z_4$). Element 6, wherein the one or more one-way check valves only allow fluid to pass from the fourth pressure zone ($Z_4$) to the fifth pressure zone ($Z_5$) when subjected to a minimum check valve pressure. Element 7, wherein the bypass valve return spring is configured to move the bypass valve piston to the open position when no fluid is flowing within the pipe. Element 8, wherein the venturi profile is configured to provide a higher pressure in the first pressure zone ($Z_1$) and a lower pressure in the second pressure zone ($Z_2$) and thereby move the bypass valve piston to the closed position and close the fourth pressure zone ($Z_4$) when fluid is flowing within the pipe. Element 9, wherein the clutch mechanism is configured to disengage and thereby allow the lower sub and tubular housing to rotate relative to the tubular valve plate when the lower sub experiences increased rotational resistance. Element 10, wherein the tubular valve plate is configured to compress the spring when the clutch mechanism disengages. Element 11, wherein a compression of the spring is configured to increase a pressure in the fourth pressure zone ($Z_4$) in a closed position. Element 12, further including a first bypass port fluidly coupled with the first pressure zone ($Z_1$) of the venturi profile. Element 13, further including a second bypass fluidly coupled with the second pressure zone ($Z_2$) of the venturi profile. Element 14, wherein the venturi profile is configured to provide a higher pressure in the first pressure zone ($Z_1$) and a lower pressure in the second pressure zone ($Z_2$) and thereby move the bypass valve piston to the closed position and close the fourth pressure zone ($Z_4$) when fluid is flowing within the pipe, and wherein the clutch mechanism is configured to disengage and thereby allow the lower sub and tubular housing to rotate relative to the tubular valve plate when the lower sub experiences increased rotational resistance. Element 15, wherein the tubular valve plate is configured to compress the spring when the clutch mechanism disengages and wherein a compression of the spring is configured to increase a pressure in the fourth closed pressure zone ($Z_4$). Element 16, further including a first bypass port positioned within the first pressure zone ($Z_1$) of the venturi profile and a second bypass port positioned within the second pressure zone ($Z_2$) of the venturi profile.

Those skilled in the art to which this application relates will appreciate that other and further additions, deletions, substitutions, and modifications may be made to the described embodiments.

What is claimed is:

1. A downhole torque limiter, comprising:
   a tubular housing;
   a pipe positioned within the tubular housing, the pipe transitioning from a larger inside diameter ($ID_L$) to a smaller inside diameter ($ID_S$), thereby forming a venturi profile having a first pressure zone ($Z_1$) and a second pressure zone ($Z_2$);
   a tubular valve plate radially positioned between the tubular housing and the pipe and rotationally fixed with the pipe;
   a lower sub rotationally fixed relative to the tubular valve plate and the pipe and rotationally coupled to the tubular housing via a clutch mechanism, the tubular valve plate configured to be axially forced uphole by the clutch mechanism when the pipe encounters resistance; and
   a valve assembly positioned within a longitudinal opening extending along at least a portion of a sidewall of the tubular valve plate, the valve assembly configured to be activated by a pressure differential created by fluid flowing through the venturi profile, the valve separating the first pressure zone (Z1) and a third pressure zone (Z3).

2. The downhole torque limiter as recited in claim 1, wherein the valve assembly includes a bypass valve piston and a bypass valve return spring, the bypass valve piston defining the third pressure zone ($Z_3$), a pressure within the third pressure zone (Z3) configured to move the bypass valve piston to a closed position or open position to close or open a fourth pressure zone ($Z_4$) based upon a pressure differential across the first pressure zone ($Z_1$) and the second pressure zone ($Z_2$).

3. The downhole torque limiter as recited in claim 2, wherein the fourth pressure zone ($Z_4$) includes a spring positioned between a shoulder of the tubular housing and a face of the tubular valve plate.

4. The downhole torque limiter as recited in claim 3, wherein the spring is a Bellevue spring.

5. The downhole torque limiter as recited in claim 3, further including one or more one-way check valves located in one or more additional longitudinal openings extending along an entirety of the sidewall of the tubular valve plate, the one or more check valves separating the fourth pressure zone ($Z_4$) and a fifth pressure zone ($Z_5$).

6. The downhole torque limiter as recited in claim 5, wherein the one or more one-way check valves allow fluid to pass from the fourth pressure zone ($Z_4$) to the fifth pressure zone ($Z_5$) but not from the fifth pressure zone ($Z_5$) to the fourth pressure zone ($Z_4$).

7. The downhole torque limiter as recited in claim 6, wherein the one or more one-way check valves only allow fluid to pass from the fourth pressure zone ($Z_4$) to the fifth pressure zone ($Z_5$) when subjected to a predetermined check valve pressure.

8. The downhole torque limiter as recited in claim 6, wherein the bypass valve return spring is configured to move the bypass valve piston to the open position when no fluid is flowing within the pipe.

9. The downhole torque limiter as recited in claim 8, wherein the venturi profile is configured to provide a higher pressure in the first pressure zone ($Z_1$) and a lower pressure in the second pressure zone ($Z_2$) and thereby move the bypass valve piston to the closed position and close the fourth pressure zone ($Z_4$) when fluid is flowing within the pipe.

10. The downhole torque limiter as recited in claim 9, wherein the clutch mechanism is configured to disengage when the pipe experiences increased rotational resistance and thereby allow the lower sub and tubular housing to rotate relative to the tubular valve plate and pipe.

11. The downhole torque limiter as recited in claim 10, wherein the tubular valve plate is configured to compress the spring when the clutch mechanism disengages.

12. The downhole torque limiter as recited in claim 11, wherein a compression of the spring is configured to increase a pressure in the fourth pressure zone ($Z_4$).

13. The downhole torque limiter as recited in claim 1, further including a first bypass port fluidly coupling the first pressure zone ($Z_1$) of the venturi profile and the third pressure zone (Z3) containing the valve assembly.

14. The downhole torque limiter as recited in claim 13, further including a second bypass port fluidly coupling the second pressure zone ($Z_2$) of the venturi profile and a fifth pressure zone (Z5) including one or more one-way check valves.

15. A well system, comprising:
   a wellbore;
   a tubing string positioned within the wellbore; and
   a torque limiter coupled with the tubing string, the torque limiter including:
      a tubular housing;
      a pipe positioned within the tubular housing, the pipe transitioning from a larger inside diameter ($ID_L$) to a smaller inside diameter ($ID_S$), thereby forming a venturi profile having a first pressure zone ($Z_1$) and a second pressure zone ($Z_2$);
      a tubular valve plate radially positioned between the tubular housing and the pipe and rotationally fixed with the pipe;
      a lower sub rotationally fixed relative to the tubular valve plate and the pipe and rotationally coupled to the tubular housing via a clutch mechanism, the tubular valve plate configured to be axially forced uphole by the clutch mechanism when the pipe encounters resistance; and a valve assembly positioned within a longitudinal opening extending along at least a portion of a sidewall of the tubular valve plate, the valve assembly configured to be activated by a pressure differential created by fluid flowing through the venturi profile, the valve separating the first pressure zone (Z1) and a third pressure zone (Z3).

16. The well system according to claim 15, wherein the valve assembly includes a bypass valve piston and a bypass valve return spring, the bypass valve piston defining the third pressure zone ($Z_3$), a pressure within the third pressure zone (Z3) configured to move the bypass valve piston to a closed position or open position to close or open a fourth pressure zone ($Z_4$) based upon a pressure differential across the first pressure zone ($Z_1$) and the second pressure zone ($Z_2$).

17. The well system as recited in claim 16, wherein the fourth pressure zone ($Z_4$) includes a spring positioned between a shoulder of the tubular housing and a face of the tubular valve plate.

18. The well system as recited in claim 17, further including one or more one-way check valves located in one or more additional longitudinal openings extending along an entirety of the sidewall of the tubular valve plate, the one or more check valves separating the fourth pressure zone ($Z_4$) and a fifth pressure zone ($Z_5$).

19. The well system as recited in claim 18, wherein the one or more one-way check valves allow fluid to pass from the fourth pressure zone ($Z_4$) to the fifth pressure zone ($Z_5$) but not from the fifth pressure zone ($Z_5$) to the fourth pressure zone ($Z_4$), and wherein the one or more one-way check valves only allow fluid to pass from the fourth pressure zone ($Z_4$) to the fifth pressure zone ($Z_5$) when subjected to a predetermined check valve pressure.

20. The well system as recited in claim 19, wherein the bypass valve return spring is configured to move the bypass valve piston to the open position when no fluid is flowing within the pipe.

21. The well system as recited in claim 20, wherein the venturi profile is configured to provide a higher pressure in the first pressure zone ($Z_1$) and a lower pressure in the second pressure zone ($Z_2$) and thereby move the bypass valve piston to the closed position and close the fourth pressure zone ($Z_4$) when fluid is flowing within the pipe, and wherein the clutch mechanism is configured to disengage when the pipe experiences increased rotational resistance and thereby allow the lower sub and tubular housing to rotate relative to the tubular valve plate and pipe.

22. The well system as recited in claim 21, wherein the tubular valve plate is configured to compress the spring when the clutch mechanism disengages and wherein a compression of the spring is configured to increase a pressure in the fourth closed pressure zone ($Z_4$).

23. The well system as recited in claim 15, further including a first bypass port positioned within the first pressure zone ($Z_1$) of the venturi profile and a second bypass port positioned within the second pressure zone ($Z_2$) of the venturi profile, the first pressure zone (Z1) of the venturi profile and a third pressure zone (Z3) containing the valve assembly and the second pressure zone (Z2) of the venturi profile and a fifth pressure zone (Z5) including one or more one-way check valves.

24. A method for limiting torque in a well system, the method comprising:
running a downhole torque limiter into a wellbore, the downhole torque limiter coupled with at least a tubing string and including:
a tubular housing;
a pipe positioned within the tubular housing, the pipe transitioning from a larger inside diameter ($ID_L$) to a smaller inside diameter ($ID_S$), thereby forming a venturi profile having a first pressure zone ($Z_1$) and a second pressure zone ($Z_2$);
a tubular valve plate radially positioned between the tubular housing and the pipe and rotationally fixed with the pipe;
a lower sub rotationally fixed relative to the tubular valve plate and the pipe and rotationally coupled to the tubular housing via a clutch mechanism, the tubular valve plate configured to be axially forced uphole by the clutch mechanism when the pipe encounters resistance; and
a valve assembly positioned within a longitudinal opening extending along at least a portion of a sidewall of the tubular valve plate, the valve assembly configured to be activated by a pressure differential created by fluid flowing through the venturi profile, the valve separating the first pressure zone (Z1) and a third pressure zone (Z3);
pumping fluid down the pipe to create a higher pressure in the first pressure zone (Z1) and a lower pressure in the second pressure zone (Z2);
sensing a rotation of the pipe relative to the tubular housing, of which is an indication that the clutch mechanism is disengaged; and
stopping pumping the fluid down the pipe to equalize the pressure in the first pressure zone (Z1) and the pressure in the second pressure zone (Z2), the equalized pressure allowing the clutch mechanism to reengage.

* * * * *